May 10, 1966 R. D. ROBINSON ETAL 3,251,044

MAGNETIC STORAGE DEVICE

Filed Sept. 12, 1961 2 Sheets-Sheet 1

INVENTORS.
R. D. ROBINSON.
J. E. BELT.
R. A. BREMMER.

BY
William C. Cahill

INVENTORS.
R. D. ROBINSON.
J. E. BELT.
R. A. BREMMER.
BY
William C. Cahill

United States Patent Office 3,251,044
Patented May 10, 1966

3,251,044
MAGNETIC STORAGE DEVICE

Richard D. Robinson, Scotia, N.Y., and John E. Belt, Phoenix, and Robert A. Bremmer, Scottsdale, Ariz., assignors to General Electric Company, a corporation of New York Filed Sept. 12, 1961, Ser. No. 137,657
3 Claims. (Cl. 340—174)

The present invention relates to apparatus for storing digital information, and more specifically, to magnetic memory devices.

Magnetic storage devices of the prior art are usually of the well-known coincident current core type. Generally, such magnetic core storage devices utilize torroidal shaped cores of a material having a substantially rectangular hysteresis characteristic. The torroidal cores are provided with two energizing or drive windings each; further, a sensing winding, common to all cores, is provided for sensing the presence of stored information in any of these cores. Each drive winding of each core is usually a single turn winding in the form of a single conductor passing through the center of the torroidal core. Since each core is provided with two drive windings, two conductors, perpendicular to each other, are passed through each core and are connected to suitable sources of driving current. These two conductors are commonly referred to as the X and Y drive windings.

To simplify the construction of such magnetic storage devices, the cores are arranged in rows and columns to form a matrix. Each row of cores is threaded with a common conductor, or X winding, and each column is threaded with a common conductor or Y winding. In addition, another conductor, the sense winding, is threaded through all of the cores in the matrix. The resulting structure is commonly known as a core plane. Usually, a plurality of such core planes are included as the information storage or memory of a digital computer. Since it is possible to sense, or read out any given core in each of the planes of the memory at any instant, such a memory storage system is referred to as a random access core memory.

If current is passed through the windings of a core to induce flux in a given direction and drive the core to magnetic saturation, the presence of a particular state of saturation may conveniently be designated a binary "1" state. If the current in the drive windings is in the opposite direction, the core is then saturated with flux in the opposite direction, and the reverse state of saturation may be utilized to indicate a binary "0" state. Therefore, any core in a given matrix may be saturated in either of two directions, and the state of saturation utilized to indicate the existence of a binary "1" or a binary "0."

Since such prior art random access core memories require a coincidence of current in both of the X and Y drive windings to force the respective core to saturation, the timing of the drive currents becomes critical. Further, since all of the cores in a core plane are threaded with a single sense winding, a single bit must be read out of, or written into, the core plane at any given time; consequently, simultaneous reading and writing is impossible. When a particular core is to be saturated by currents in its respective X and Y drive windings, the sum of the currents in the drive windings must be sufficient to induce saturation in the core; however, the individual drive currents must not, in themselves, be of such magnitude to cause saturation since these drive currents are passing through all of the cores in the column and row, respectively, in which the selected core is positioned.

Thus, it may be seen that magnetic core storage of the prior art requires a critical timing of the drive winding currents, a precise control of the current values supplied by the drive windings, and further requires that a single core in a core plane (thus, a single bit) be read out of, or written into the core plane at any given time, and prohibits the simultaneous writing and reading of information in the core plane.

Accordingly, it is an object of the present invention to provide an improved magnetic storage device for storing digital information.

It is another object of the present invention to provide a magnetic storage device that may be utilized in a plane that is capable of simultaneously being written into and read out of.

It is still another object of the present invention to provide a magnetic storage device in which the timing of the reading and writing currents are not critical.

It is a further object of the present invention to provide a magnetic storage device in which the reading and writing currents need not be precisely controlled.

Further objects and advantages of the present invention will become apparent to those skilled in the art as the description thereof proceeds.

Briefly stated, in accordance with one embodiment of the present invention, a magnetic storage device is provided utilizing a pair of magnetizable elements such as magnetic cores to store a single bit of binary information. A bias winding is provided for each core and a biasing current is applied thereto. A writing winding is provided for one of the cores, and may be energized upon removal of the bias current from the biasing windings. A read winding is provided for the other core, and may be utilized to sense the condition of saturation of the second magnetic core. Each core is provided with a set winding, and means are provided for connecting the set windings of the two cores in series to form a closed electrical loop. The second core is also provided with an appropriate sense winding for sensing changes in the direction of saturation of the second magnetic core. The core pair, corresponding to a given bit position in a core plane, may be addressed by removing the biasing current from the core pair, and applying a writing current to saturate the first core of the core pair. The closed electrical loop connecting the set windings of the two cores will cause saturation of the second core when the direction of saturation of the first core is changed by the write current. Subsequently, the bias current is reapplied and the direction of saturation of the first core assumes its original direction. The information stored in the core pair may be sensed by applying a read current to the read winding of the second core; a change in the direction of saturation of the second core caused by the read current may indicate the presence of a binary "1." Whereas, no change in the direction of saturation of the second core may indicate the presence of a binary "0."

The invention both as to its organization and operation, together with further objects and advantages thereof may best be understood by reference to the following description taken in connection with the accompanying drawings in which.

Figure 1:
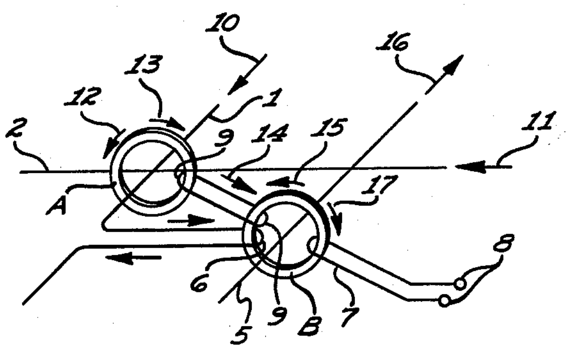
FIG. 1 shows a magnetic storage device constructed in accordance with the teachings of the present invention.

Referring to FIG. 1, a pair of magnetizable elements, such as a core pair comprising magnetic cores A and B, are arranged for storing a single bit of digital information. The cores may be any magnetic material having a substantially rectangular hysteresis loop such as shown in FIG. 2.

Core A is provided with bias winding 1 for driving core A to saturation in a given direction. Core A is also provided with a write winding 2 for causing saturation in a direction opposite to that caused by the bias winding. Core B is provided with a read winding 5 for causing saturation in a given direction. A bias winding 6, on core B, is connected in series with the bias winding 1 of core A. A sense winding 7 is provided for sensing the change in direction of saturation of core B; the sense winding 7 may be connected to suitable output terminals 8. Cores A and B are each provided with a set winding 9; the set windings 9 of each core are connected in series to form a closed electrical loop.

Figure 2:
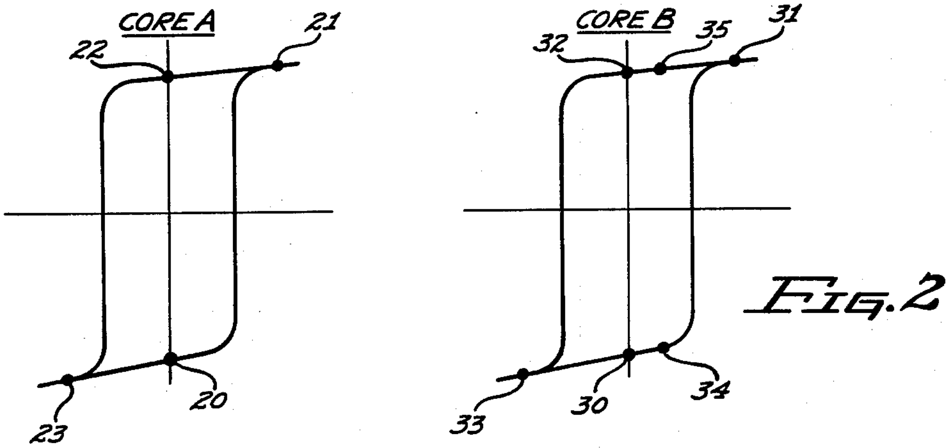
FIG. 2 illustrates the hysteresis loops of the magnetizable elements of the magnetic storage device shown in FIG. 1.

The operation of the magnetic storage device of FIG. 1 may be described with the aid of the hysteresis loops for cores A and B shown in FIG. 2. Assuming the magnetic core storage device is to have a binary "1" written therein, the bias current, applied to winding 1 of core A and winding 6 of core B from a source of bias current (not shown) in the direction of arrow 10, is removed. At this instant, the state of flux in core A may be defined by the point 20 on the hysteresis loop of FIG. 2; similarly, it will be assumed that core B does not presently have a binary "1" stored therein, and the state of the flux therein may be defined by the point 30 on the hysteresis loop of FIG. 2. A write current is subsequently applied to winding 2, in the direction of the arrow 11, from a suitable current source (not shown). Since the winding 2 is wound on core A in the opposite sense with respect to bias winding 1, the direction of saturation of the core A is changed from that indicated by arrow 12 to that indicated by arrow 13. The state of flux in core A at this instant may be defined by point 21 on the hysteresis loop of FIG. 2. The change in the direction of saturation of core A is sensed by the set winding 9 which induces a current in the closed electrical loop as indicated by the arrow 14. The current in the set winding 9 of core B causes the core to saturate in the direction indicated by arrow 15. The state of the flux at this instant in core B may be defined by the point 31 on the hysteresis loop of FIG. 2.

The write current on winding 2 may now be removed, and the bias current reapplied to the magnetic core storage element. The state of flux in cores A and B after the removal of the write current may be defined by points 22 and 32 respectively on the hysteresis loops of FIG. 2. The reapplication of the biasing current to magnetic core A causes a change in the direction of saturation thereof to the direction indicated by arrow 12. The state of flux at this instant in core A may be defined by point 23 on the hysteresis loop of FIG. 2. The reversal in the direction of saturation of core A induces a current in the set winding thereof in a direction opposite the direction indicated by arrow 14; this current would normally attempt to change the direction of saturation of core B. However, the bias winding 6 of core B is connected in series with the bias winding 1 of core A, and the current in the bias winding 6 sets up an opposing magnetomotive force to that set up by set winding 9. Although the current flowing in the biasing windings is sufficient to saturate core A, the current value and the number of turns of the winding is chosen so that current in winding 6 is insufficient to cause saturation of core B. Therefore, the magnetomotive force of the current in winding 6 opposes that of winding 9, and prevents the change in the direction of saturation of core B when the biasing current is reapplied to the magnetic core storage device. The state of magnetic flux of core B at this instant may be described by point 32 on the hysteresis loop of FIG. 2.

The magnetic storage device thus remains in the "store binary 1" state regardless of the direction of saturation of core A, and thus regardless of the existence of a biasing current or a writing current. The information stored in the magnetic core storage device may be read out by application of a reading current from a suitable current source (not shown) to winding 5 in the direction indicated by the arrow 16. The current in winding 5 in the direction indicated by the arrow 16 will cause a reversal of the direction of saturation in the core B as indicated by the direction of the arrow 17. This change in the direction of saturation of magnetic core B induces a voltage in the sense winding 7, and presents this voltage to terminals 8 as an indication of the presence of a stored binary "1." The state of flux in core B at this instant may be defined by the point 33 on the hysteresis loop of FIG. 2. As mentioned previously, the biasing current, while of sufficient magnitude to cause saturation of core A, is not of sufficient magnitude to cause saturation of core B (this relationship may be effected, for example, by properly choosing the turn's ratio); the state of the flux of core B under the exclusive influence of the bias current in biasing windings 6 may be described by point 34 or 35 on the hysteresis loop of FIG. 2 depending on the direction of saturation at the time the biasing current is impressed on the biasing winding 6.

Figure 3:
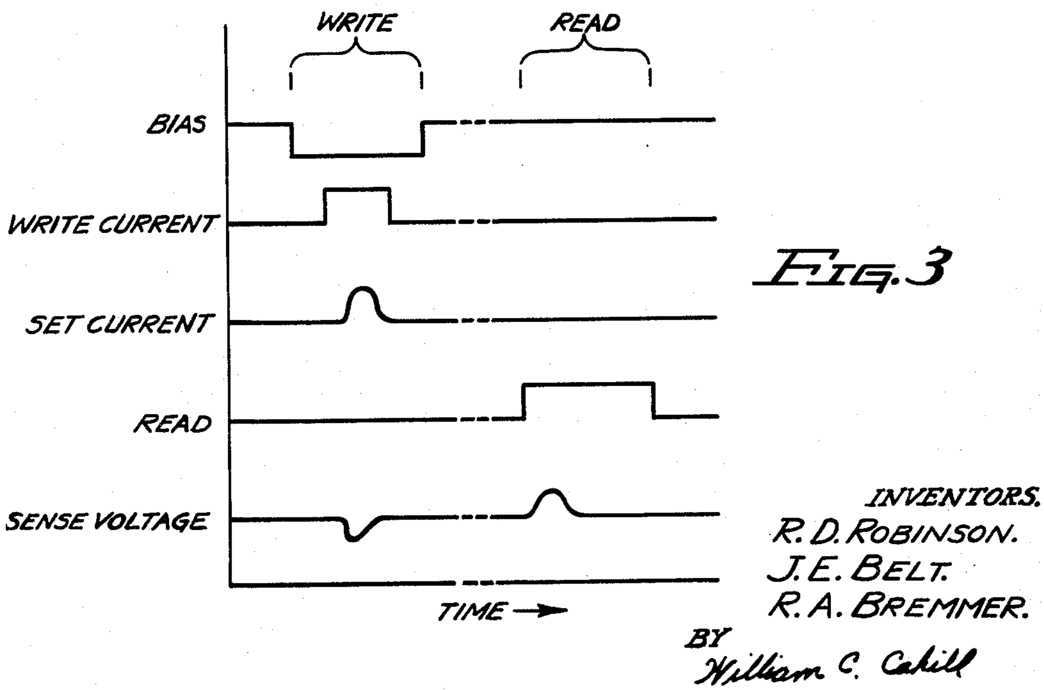
FIG. 3 is a timing diagram useful for describing the operation of the magnetic storage device of FIG. 1.

Thus, the operation of the magnetic storage device of FIG. 1 may be summarized briefly with the aid of the timing diagram of FIG. 3. Assuming the initial conditions of a bias current flowing through the bias windings of the cores A and B, and assuming that a binary "1" is to be inserted in the element, the bias current is then turned off. A write current is thus applied to the write winding of magnetic core A and the resulting change in the direction of saturation causes a set current in the closed electrical loop connecting the set windings of cores A and B. The set current causes the saturation of magnetic core B, and thus orients the flux in the saturated core B to indicate a binary "1." The magnetic core storage device thus retains the stored binary "1," and continues to store this information even though bias current is once again applied to biasing windings 1 and 6. When it is desired to read the information stored in the magnetic core storage device, a read current is applied to the read winding 5 of the magnetic core B. If a binary "1" had been stored therein prior to the energization of the read winding (as was assumed), the direction of saturation of the magnetic core B will change, and a voltage will be induced in the sense winding 7 and supplied to the terminals 8. It may be noted that the sense voltage shown in FIG. 3 provides a relatively positive pulse when the storage element contains a binary "1"; similarly, the absence of a pulse represents the storage of a binary "0." The relatively negative voltage pulse, shown in FIG. 3, appearing at the output terminals 8 is caused by the change in direction of saturating flux in the magnetic core B when the write current is applied to magnetic core A; this relatively negative voltage pulse may be easily eliminated by providing a suitably polarized diode in series with the sense winding 7 of the magnetic core B.

While the magnetic storage device illustrated in FIG. 1 was described in terms of magnetic cores, it will be obvious to those skilled in the art that other configurations may be equally suitable for use as magnetizable elements in the magnetic storage device of the present invention; for example, thin films may replace the magnetic cores of FIG. 1. The magnetic material chosen for use in the present invention may be any magnetic material having a substantially rectangular hysteresis loop and may be, for example, ferromagnetic, anti-ferromagnetic, or a permalloy material.

Figure 4:
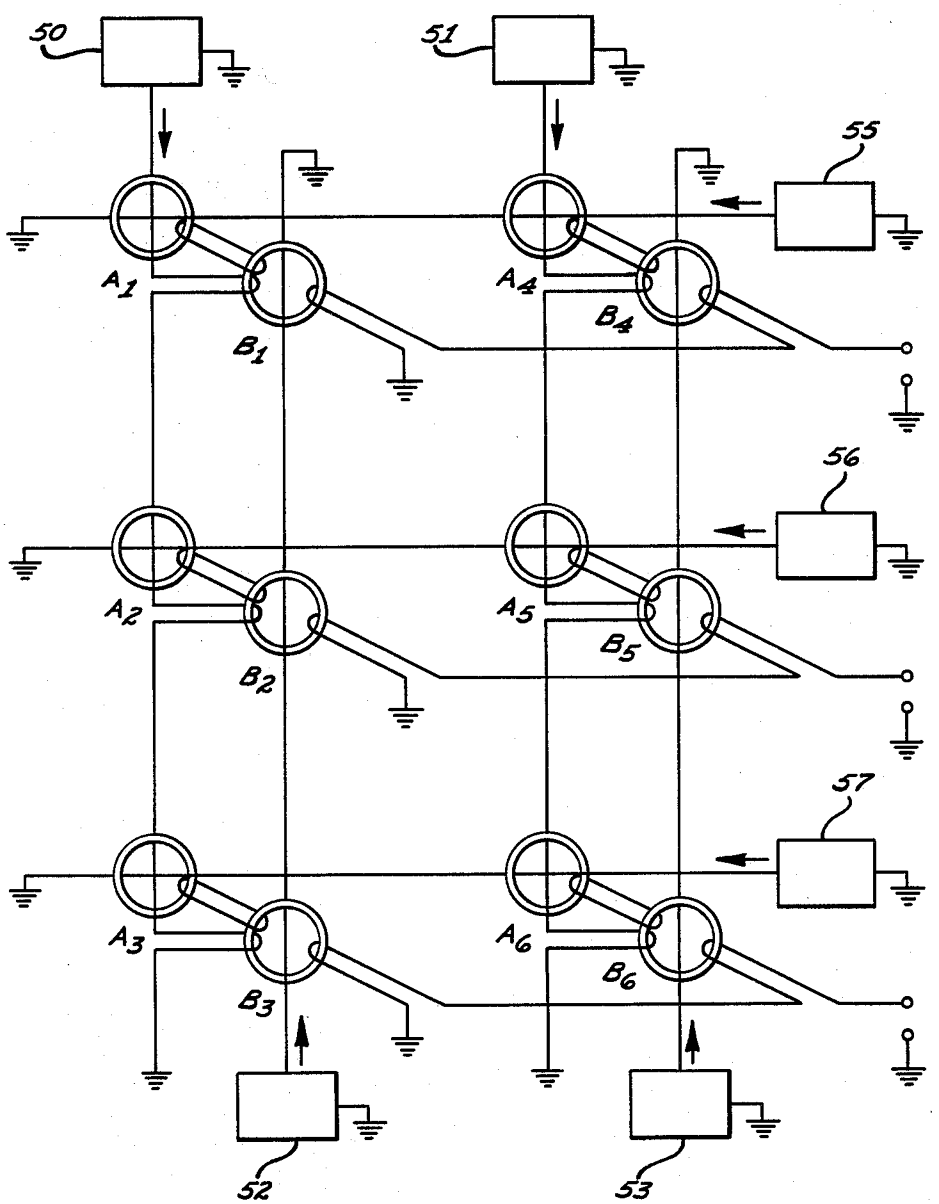
FIG. 4 is a schematic diagram illustrating a magnetic storage plane constructed in accordance with the teachings of the present invention.

Referring to FIG. 4, a plurality of magnetic core storage devices are arranged and interconnected to form a magnetic core plane. Each magnetic core storage device is designated by the magnetic core pair which it contains; thus, the first storage element is designated $A_1B_1$, the second storage device is designated $A_2B_2$, etc. Magnetic core storage devices $A_1B_1$, $A_2B_2$, and $A_3B_3$ are arranged to form a column. A source of bias current 50 is connected to the bias windings of all of the cores in the column. Similarly, storage devices $A_4B_4$–$A_6B_6$ are provided with a common bias current source 51. Each column is also provided with a read current source 52 and 53, respectively. The storage devices are also arranged to form rows, that is, storage devcies $A_1B_1$ and $A_4B_4$ are arranged in a row having a common source of writing current 55. Similarly, storage devices $A_2B_2$ and $A_5B_5$ are connected to form a row and have a common writing current source 56. The core plane may be utilized to store words (a plurality of binary bits) in columns and may be utilized to simultaneously read and write these words in parallel.

The operation of the core plane of FIG. 4 may be described as follows. It will be assumed that it is desired to store the binary word 101, in the first column of the core plane. To write a word into the first column of the core plane, bias current source 50 is switched off, and the selected write current sources are switched on. In the particular example chosen for illustration, write current sources 55 and 57 would be turned on. As a result of the current flowing through the write windings of cores $A_1$ and $A_3$, the respective directions of saturation of each core would be reversed, and the associated core of each core pair ($B_1$ and $B_3$) will be saturated by the current flowing in the set winding connected to the set winding of the corresponding core A. The write currents from the write current sources 55 and 57 may then be shut off, and the bias current from bias current source 50 turned on. All of the A cores in the column will be driven to the same direction of saturation by the bias current, and those A cores having had their direction of saturation reversed by write currents will then return to their previous directions of saturation. At this particular instant, all of the A cores of the storage devices in the first column are in the state of flux defined by point 23 of the hysteresis loop of FIG. 2. However, the state of the flux in core $B_2$ is defined by point 30 of the hysteresis loop of FIG. 2, whereas, the state of the flux in cores $B_1$ and $B_3$ may be defined by point 32 of the hysteresis loop of FIG. 2. Therefore, column 1 of a core plane of FIG. 4 now contains the binary word 101, and will continue to store the word until it is withdrawn.

The word stored in the core plane of FIG. 4 may be read out by applying a reading current to the read windings of magnetic cores $B_1$, $B_2$, and $B_3$. The read current is supplied by the read current source 52, and may be applied at any time it is desired to obtain the information contained in the corresponding column; thus, information may be written into the core plane in another column while a column containing information is read. In the particular case chosen for illustration, the application of a reading current to the cores $B_1$, $B_2$, and $B_3$, results in the reversal of the direction of saturation of cores $B_1$ and $B_3$, and no change in the direction of saturation of core $B_2$. As a result, a voltage will be induced in the sense of windings of cores $B_1$ and $B_3$, and a positive voltage pulse will be presented at the respective output terminals of those cores.

Since information is read into a particular storage device by the application of current to a single write winding, timing of the write current is not critical, and the write current may actually start to flow before the bias current is turned off. Since all of the cores supplied by a common write current source are also supplied with an independent bias source, it is unnecessary to control the magnitude of the write current within precise limits, and considerable variation in the current magnitude is permissible.

While the principles of the invention have now been made clear in illustrative embodiments, there will be immediately obvious to those skilled in the art many modifications in structure, arrangement, proportions, the elements, materials and components, used in the practice of the invention, and otherwise, which are particularly adapted for specific environments and operating requirements, without departing from those principles. The appended claims are, therefore, meant to cover and embrace any such modifications, within the limits only of the true spirit and scope of the invention.

What is claimed as new and desired to secure by Letters Patent of the United States is:

1. Means for storing a binary digit comprising; a first magnetizable element having a bias winding for saturating said element in one direction, a write winding for saturating said element in the opposite direction, and a set winding for sensing changes in the direction of saturation in said element; a second magnetizable element having a set winding for saturating said second element in one direction, a read winding for saturating said second element in the opposite direction, a bias winding for preventing said set winding from saturating said second element in other than said one direction, and a sense winding for sensing changes in the direction of saturation in said second element; means connecting the bias windings of said elements in series, and means connecting the set windings of said elements in series to form a closed electrical circuit.

2. Apparatus for storing a plurality of binary digits comprising, a source of bias current, a plurality of pairs of magnetizable elements each pair comprising; a first magnetizable element having a bias winding for saturating said element in one direction, a write winding for saturating said element in the opposite direction, and a set winding for sensing changes in the direction of saturation in said element; a second magnetizable element having a set winding for saturating said second element in one direction, a read winding for saturating said second element in the opposite direction, a bias winding for preventing said set winding from saturating said second element in other than said one direction, and a sense winding for sensing changes in the direction of saturation in said second element; means connecting the set windings of said elements of a pair of magnetizable elements in series to form a closed electrical circuit, means connected to the write windings of each pair of magnetizable elements for applying a write current thereto, means connecting the bias windings of each pair of magnetizable elements in series and to said source of bias current, and means connected to said read windings of each pair of magnetizable elements for applying a reading current thereto.

3. A magnetic memory including a plurality of storage devices arranged in rows and columns to form a matrix, each of said storage devices comprising; a first magnetic core having a bias winding for saturating said core in one direction, a write winding for saturating said core in the opposite direction, and a set winding for sensing changes in the direction of saturation in said core; a second magnetic core having a set winding for saturating said second core in one direction, a read winding for saturating said second core in the opposite direction, a bias winding for preventing said set winding from saturating said second core in other than said one direction, and a sense winding for sensing changes in a direction of saturation in said second core; means connecting the set windings of said cores in series to form a closed electrical circuit, a source of bias current, means serially connecting the bias windings of each storage device of a column to said source of bias current, a source of read current, means serially connecting the read winding of each storage device of a column to said source of read current, and means connecting the sense winding of each storage device of a row in series.

References Cited by the Examiner

UNITED STATES PATENTS

| | | | |
|---|---|---|---|
| 2,768,367 | 10/1956 | Rajchman | 340—174 |
| 2,910,674 | 10/1959 | Wittenberg | 340—174 |

FOREIGN PATENTS

| | | |
|---|---|---|
| 1,153,114 | 9/1957 | France. |
| 851,039 | 10/1960 | Great Britain. |
| 851,040 | 10/1960 | Great Britain. |

BERNARD KONICK, *Primary Examiner.*

IRVING L. SRAGOW, *Examiner.*

R. J. McCLOSKEY, M. S. GITTES, *Assistant Examiners.*